Aug. 31, 1937.  C. B. KLUPPEL  2,091,596
RELIEF VALVE FOR PUMPS
Filed Sept. 8, 1931  2 Sheets-Sheet 2
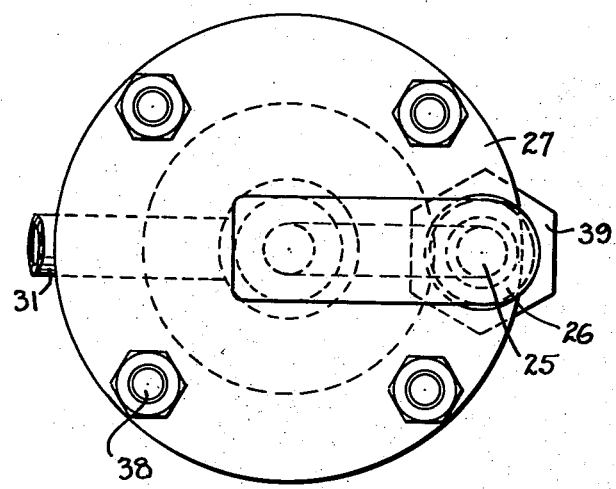
Fig. 2.
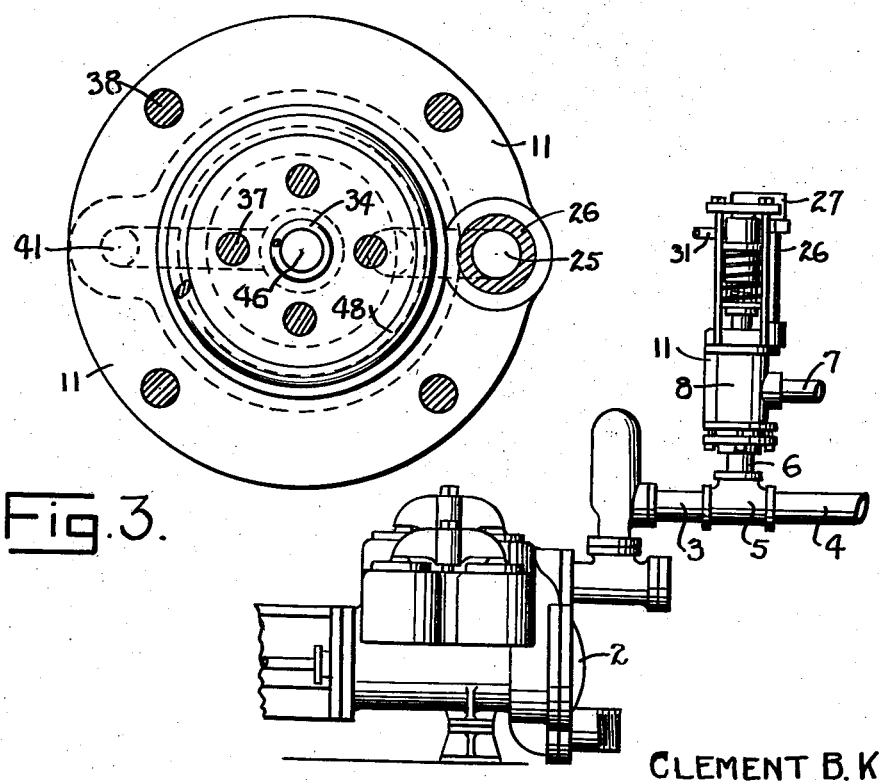
Fig. 3.
Fig. 4.
CLEMENT B. KLUPPEL
Inventor
Jesse R. Stone
Lester B Clark
By
Attorneys Patented Aug. 31, 1937

2,091,596

UNITED STATES PATENT OFFICE 2,091,596

RELIEF VALVE FOR PUMPS

Clement B. Kluppel, Houston, Tex.

Application September 8, 1931, Serial No. 561,642

1 Claim. (Cl. 137—53)

The invention relates to an improvement in relief valves of the type which are to be used upon fluid pressure lines where it is desired to release the pressure to avoid damage to the line or devices connected therewith when the value or pressure in the line exceeds a predetermined amount.

It is one of the objects of the invention to provide an automatic relief valve which will operate to relieve the pressure in the flow line and to automatically close when the pressure in the line falls below a predetemined value.

Another object of the invention is to provide in a relief valve two pressure surfaces of different area so that a differential pressure will be created and a measure of this differential pressure will serve to control the operation of the valve.

Another object of the invention is to provide an automatic relief valve wherein pressure exceeding a predetermined value tends to exert a differential pressure on movable surfaces in the valve so that a valve member in the device will be opened to release the pressure.

Still another object of the invention is to provide an automatically operable valve member wherein a pressure differential serves to release the pressure on one side of the valve member so that it will open, and to build up the pressure on the same side of the valve member when the pressure in the connecting line has been reduced to a predetermined value by the exhaust through the valve member.

Other and further objects of the invention will be readily apparent when the following description is considered in connection with the accompanying drawings wherein:

Fig. 2 is an end view looking down on the top of Fig. 1.

Fig. 3 is a section taken on the line 3—3 of Fig. 1 and looking in the direction of the arrows.

Fig. 4 is a diagrammatic view showing one application of the invention in combination with a slush pump of the type used in maintainng the circulation of the drilling fluid in the rotary method of drilling wells.

Figure 1:
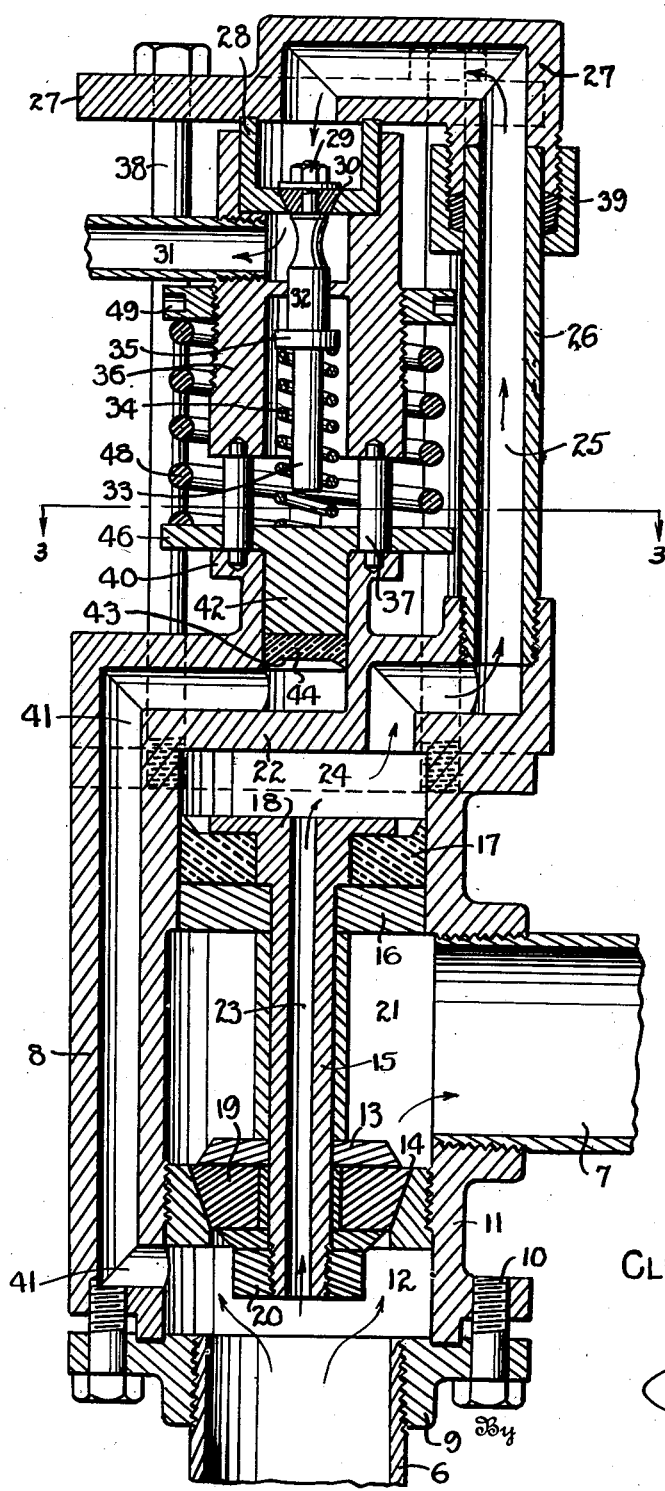
Fig. 1 is a central vertical section of a valve constructed in accordance with the invention.

In Fig. 4 a pump is indicated generally at 2 and for the purposes of the present invention this may be any type of pump desired or may be considered as any source of fluid pressure. The discharge from this pump is indicated by the pipe 3, and for the purposes of this invention the pipe 3 may be a pipe line in which the source of fluid pressure 2 is located at any remote distance, because it is contemplated that the present invention may be incorporated at any position in a fluid pressure line.

The pipe line continues at 4 with a coupling or T inserted in the line as at 5. It is intended that the present invention will be connected to the T 5 by means of an inlet pipe 6. The discharge from the valve through which the pressure is to be relieved is at 7 and this discharge or relief line may connect to a suitable storage or exhaust directly into the atmosphere.

The principal portion of the valve is contained or supported upon a housing 8, which is best seen in section in Fig. 1 and is connected by a suitable coupling 9 to the inlet pipe 6. This coupling is in the form of a head or closure member which is connected by means of the bolts 10 to the body portion 11 of the housing. The housing is preferably hollow to form an inlet chamber 12, which is closed by a valve member 13, which engages a seat 14 disposed in the inlet chamber 12.

This valve member 13 is of special construction and includes a stem 15, which carries a piston head 16, provided with a suitable packing cup 17, which is held in position by a portion of the stem 15. The piston 16 is spaced from the valve closure member 19, which is also carried by the stem 15 and held in position by a suitable lock nut 20.

The piston 16 and valve member 13 are both arranged for limited sliding movement within the body of the housing 8, which is formed with a piston chamber 21. As seen in Fig. 1, the downward movement of this device in the chamber 21 is limited by the seat 14 and the upward movement is limited by the engagement of the end of the stem 15 with the partition 22 in the body 11. A leak or passage 23 is provided through the central portion of the stem 15, which is arranged to discharge into a pressure chamber 24, which is that portion of the chamber 21 which is defined by the piston 16. The discharge, or relief pipe 7, connects into this chamber 21, and communication between the chambers 12 and 21 is accomplished by the rising of the valve member 13 away from the seat 14.

From the chamber 24 is a passage or bypass 25, which extends through a pipe 26 connected with the body 11 and leads into a cap member 27. This bypass 25 leads to a pressure cup 28, which cup serves as a seat for the pressure surface 29, which seats on the cup at 30. This pressure surface or pressure area 29 serves to control the escape of fluid from the cup 28 and the passage 25. When this pressure area is raised there will be a flow of fluid into the exhaust line 31, which may lead to the atmosphere or to a suitable storage tank.

The pressure area 29 is mounted on a valve rod 32, which extends through the cup member 28 and downwardly to a position such that it terminates in a push rod 33. Surrounding this push rod is a light coil spring 34, which abuts against a shoulder 35 defining the connection between the valve rod 32 and the push rod 33. The cup member 28 is retained in position against the cap 27 by means of a nipple 36, which nipple also carries the exhaust line 31. This nipple 36 is held in position by means of a series of guide pins 37, one end of which pins are adapted to engage the body 11 and the other end of which are in engagement with the bushing 36. The cap member 27 is held in engagement with the body 11 by means of the stay bolts 38 and also by engagement of a stuffing box 39 around the pipe 26.

As seen in Fig. 1, the upper portion of the body 11 is provided with an extending flange 40 which is hollow and serves as the upper end for an opening 41, which extends downwardly through the body 11 and opens into the inlet chamber 12. Disposed in the hollow area of the flange 40 is a plunger 42, which is provided with a pressure area 43 formed by a resilient pad or base 44 thereon. This plunger 42 is provided with an enlarged head 46 which projects beyond the flange 40 and is arranged for sliding movement on the guide pins 37, by having openings in the head. A coil spring 48 is provided above the head 46 with one end abutting thereagainst. The opposite end of this spring 48 engages an adjustable seating ring 49, which is threaded externally on the bushing 36. This ring 49 can be rotated to vary the compression placed upon the spring 48 and in this manner control the pressure which is applied to the base 44 of the plunger 42, in order to resist pressure which occurs in the passage 41. The spring 34 surrounding the push rod 33 also abuts against the head 46 of the plunger 42.

With the foregoing construction in mind it will be apparent that there are two pressure surfaces or pressure areas of different sizes which are movable with respect to each other. These are the surfaces 29 and 43. The surface 43 is larger than the surface 29. To assist 29 in balancing the pressure on 43 the springs 34 and 48 have been provided.

The operation of the device is as follows:
Due to the operation of the source of power 2, the fluid pressure in the lines 3 and 4 accumulates. In the specific embodiment of the invention where a circulation of drilling fluid is being maintained down through the drill stem and up through the well bore, it often occurs that the drill bit will become clogged, or, for some other reason, the circulation is obstructed. If the pump continues its operation it is obvious that the pressure constantly builds up in the lines 3 and 4 and serious damage often results. This increase of pressure is, of course, applied in the inlet chamber 12 and tends to raise the valve member 13 from its seat 14. Under normal condition, however, the valve member 13 is balanced in the chamber 21 because of the leak 23 which permits the pressure in the pipe 6 and inlet chamber 12 to also be applied upon the head 18 of the stem 15. This head is in effect the upper surface of the piston 16 and when the unit pressure in the chamber 12 is exerted on this head 18 through the leak 23 the valve will be retained in closed position because the area of the head 18 is greater than the area of the valve 13 exposed to the unit pressure in the chamber 12.

The principal object of the invention is to open and close the valve member 13 in response to the pressure exerted in the inlet chamber 12. To accomplish this function the unit pressure in the chamber 12 is also exerted in the bypass 41 and is available on the pressure area 43 on the lower end of the plunger 42.

Under normal conditions this pressure exerted on the area 43 will raise the plunger 42 to compress the spring 48 and the spring 34 to such an extent that the head 46 will engage the lower end of the push rod 33. When this occurs additional pressure is applied to the head 46 to resist its further upward movement by means of the push rod 33. The push rod 33 is held in a stationary position by the valve rod 32 and the unit pressure exerted on the pressure area 29. The pressure on this area 29 is exerted through the bypass 25 from the chamber 24 above the head 18. In other words, when the pressure in the pipe 6 is below a predetermined value at which the valve may be adjusted to open, the parts will be in a balanced condition with the plunger 42 raised against the push rod 33. In this position the compression of the springs 34 and 48 tend to balance the differential pressure between the area 43 and the area 29. By adjustment of the ring 49 this differential may be varied so that the predetermined pressure at which the valve will open can be set within definite limits.

A set of conditions will now be assumed wherein the pressure in the inlet chamber 12 increases to a value above that at which it is intended that the valve shall open, or above the value which it is desired to maintain in the pipe lines 3 and 4.

When the pressure increases in the chamber 12, this increase, of course, is transmitted through the leak 23 to the chamber 24 and to the pressure area 29. The increase is also transmitted through the passage 41 to the pressure area 43. The unit pressure on the areas 29 and 43 is identical, except for friction losses in the connecting passages. Inasmuch as the area 43 is greater than the area 29 any increase in pressure per unit area causes a differential pressure to be created by the two areas. This differential pressure is resisted by the springs 34 and 48, which, however, exert a steady and constant pressure. Thus when the fluid pressure on the two surfaces increases to a value such that the differential pressure exceeds the force of the springs, the pressure surface 43 will then move upwardly to carry with it the push rod 33 and unseat the pressure member 29 from its seat 30. This movement permits escape of fluid from the cap 28 into the exhaust line 31 and causes a reduction in the pressure in the bypass line 25 and the chamber 24. In this manner the pressure on the head of the piston 18 is relieved to some extent. It should be noted that the leak passage 23 is of considerably less cross sectional area than the passage 25. The escape passage when the valve member 29 is raised permits an escape of fluid greater than can be forced through the leak passage 23, so that within a very short period the pressure in the chamber 24 is reduced to a value below the pressure in the chamber 12. When the total pressure in the chamber 24 against the head 18 falls below the total pressure in the chamber 12 exerted on the valve member 13, the entire valve will move upwardly to open the chamber 12 into the chamber 21 and permit a large volume of fluid to exhaust through the relief pipe 7.

It seems obvious that as the pressure in the inlet chamber 12 and inlet pipe 6 is thus reduced that the pressure in the bypass 41 and against the pressure area 43 will also be reduced. It should be remembered, however, that there still remains some pressure on the area 29, which is equivalent to that pressure which can pass through the leak 23. When the total pressure on the area 43 is reduced due to the relief of the pressure through the pipe 7 to a value which is less than the pressure on the area 29, plus the force of the springs, the plunger 42 will tend to move downwardly or back to its original position. This movement permits the pressure on the member 29 to move the valve rod 32 downwardly and cause seating of the member 29 at 30. When this occurs, the exhaust through the pipe 31 is cut off and the fluid passing through the leak 23 tends to build up the pressure in the chamber 24 and the passage 25. As this pressure builds up it will gradually increase to a value such that the unit pressure on the head 18 exceeds the reduced pressure on the lower part of the valve 13. When this occurs the piston 16 will be caused to move downwardly and the valve member 13 will again seat at 14, closing the escape of pressure into the line 7 and restoring the parts to their original position.

From the foregoing description it will be seen that a complete cycle of events has been traced. The valve works automatically to relieve the pressure in the pipe line when such pressure exceeds a predetermined value which is variable by adjustment of the ring 49. The valve operates to close when the pressure has been relieved to a point such that it falls below the value set by adjustment of this ring 49. It will be apparent that no attention is required during the operation of the valve and it may be set to perform its functions and any injury to the line, in which it has been inserted, will be avoided.

What I claim is:—

A pilot valve mechanism for causing the opening and closing of a relief valve, comprising a plunger subjected on one side to the pressure to be relieved, a pilot valve held in closed position by the pressure to be relieved, means on said pilot valve which is engaged by said plunger to open said pilot valve, a spring tending to move said plunger against the pressure to be relieved, and a second spring mounted intermediate said plunger and said valve urging both said plunger and said pilot valve against the pressure to be relieved.

CLEMENT B. KLUPPEL.